United States Patent [19]

DeMarco

[11] Patent Number: 4,786,299
[45] Date of Patent: Nov. 22, 1988

[54] VACUUM LOADER WITH SILENCER BASE

[76] Inventor: Thomas E. DeMarco, 5815 N. Cicero Ave., Chicago, Ill. 60646

[21] Appl. No.: 24,019

[22] Filed: Mar. 10, 1987

Related U.S. Application Data

[63] Continuation-in-part of Ser. No. 868,695, May 30, 1985, Pat. No. 4,718,924.

[51] Int. Cl.⁴ .............................................. B01D 46/04
[52] U.S. Cl. ....................................... 55/276; 55/302; 55/337; 55/347; 55/348; 55/398; 181/256; 181/270
[58] Field of Search ................. 55/276, 302, 337, 467, 55/345-349, 468, 398, 442, DIG. 3; 181/254, 256, 270

[56] References Cited

U.S. PATENT DOCUMENTS

| | | | |
|---|---|---|---|
| 3,092,206 | 6/1963 | Moreau | 55/276 |
| 3,113,635 | 12/1963 | Allen et al. | 181/252 |
| 3,802,163 | 4/1974 | Riojas | 55/276 |
| 4,007,026 | 2/1977 | Groh | 55/302 |
| 4,050,913 | 9/1977 | Roach | 55/276 |
| 4,272,258 | 6/1981 | Shifflett | 55/52 |
| 4,504,292 | 3/1985 | Vohringer | 55/337 X |
| 4,533,370 | 8/1985 | Ikezaki et al. | 55/276 |
| 4,628,689 | 12/1986 | Jourdan | 181/270 X |

OTHER PUBLICATIONS

"Hi Vac", National Foundry Equipment Co. publication.

Primary Examiner—Charles Hart
Attorney, Agent, or Firm—Jeffrey M. Morris

[57] ABSTRACT

A unique vacuum loader is provided with a special silencer base to quietly, efficiently, and effectively remove particulate matter, debris and waste from industrial plants and other locations. The silencer base comprises a muffler and sound abatement control assembly with a composite sound attenuating chamber. The sound attenuating chamber has a zigzag channel to decrease and dampen operational noises to safe and comfortable levels. The silencer base has a top plate to support and dampen vibrations of the vacuum pump and motor.

19 Claims, 2 Drawing Sheets

VACUUM LOADER WITH SILENCER BASE

CROSS REFERENCE TO RELATED APPLICATION

This application is a continuation-in-part of application Ser. No. 868,695, filed May 30, 1985 now U.S. Pat. No. 4,718,924 of Thomas M. DeMarco, for a Four Stage Industrial Dust Collector, in Group Art Unit 135 before Examiner C. Hart.

BACKGROUND OF THE INVENTION

This invention pertains to vacuum cleaner loaders for removing dry and wet liquid particulates and, more particularly, to a muffler for use with vacuum cleaner loaders and the like.

Voluminous amounts of particulate matter, debris, and waste are emitted during machining, foundry, milling, shipment, warehousing, assembling, fabricating, and other manufacturing operations. Particulates of dust emitted during a manufacturing operation can include metal slivers, plastic chips, wood shavings, dirt, sand, and other debris. Dust accumulates on floors, machines, packaging materials, equipment, food and personnel. Dust is carried and circulated in the air and can be injurious to the health and safety of operating personnel and other on site employees. Dust can damage, erode, and adversely effect the efficiency and operability of equipment. It can also create a fire hazard and cause explosions in some situations, such as in grain elevators. Voluminous amounts of dust can pollute the atmosphere. Dust may also impair the quality of the products manufactured. Dust emissions are not only dangerous and troublesome, but are particularly aggravating and grievous where relatively dust-free conditions and sterile environments are required, such as in medical supply houses, food-processing plants, and the electronics industry.

Over the years a variety of vacuum loaders, conveyors, industrial dust collectors, and other equipment have been suggested for removing industrial dust and debris and for other purposes. Typifying these vacuum loaders, conveyors, industrial dust collectors, and other equipment are those found in U.S Pat. Nos. 485,915, 795,412, 2,276,805, 2,372,316, 2,496,180, 2,604,956, 3,320,727, 3,485,671, 3,541,631, 3,554,520, 3,577,705, 3,60S,2S3, 3,650,420, 3,653,190, 3,717,901, 3,731,464, 3,780,502, 3,842,461, 3,877,902, 3,955,236, 3,970,489, 4,032,424, 4,036,614, 4,062,664, 4,099,937, 4,111,670, 4,174,206, 4,224,043, 4272,254, 4,443,235, and 4,504,292. These prior art vacuum loaders, conveyors, dust collectors, and equipment have met with varying degrees of success.

During use, vacuum loaders make a tremendous amount of noise. Such noise can be harmful to the operator as well as nearby personnel and animals. The high decibel level of such noise can also be annoying and uncomfortable.

It is, therefore, desirable to provide an improved vacuum loader with sound abatement controls which overcomes most, if not all, of the preceding problems.

SUMMARY OF THE INVENTION

An improved vacuum cleaner loader is provided with unique sound abatement controls to quietly and effectively remove particulate matter, debris and waste from industrial plants and other locations. The novel vacuum loader is efficient, reliable, and safe. It can also be portable and accommodate standard size bins and hoppers.

The sound abatement controls comprise a unique muffler assembly which decreases and dampens operational noises to safe and comfortable levels. The unique muffler assembly includes a special support housing which provides a silencer base. The silencer base is particularly useful with a vacuum cleaner loader, as well as asbestos collectors, industrial dust collectors, and industrial waste collectors. It can also be used with other equipment.

Desirably, the silencer base has a support surface to support and dampen vibrations of other pneumatic equipment, such as a vacuum pump, blower, motor, or fan. In the preferred form, the support surface of the silencer base is flat or planar and comprises the ceiling of the support housing.

In order to reduce the noise of air or other gases passes through the vacuum loader, as well as vibrations of the vacuum pump, belts, and motor, the support housing has a unique internal sound attenuating chamber with a special channel which communicates with an inlet port (air intake) and an outlet port (exhaust) to vary the direction and substantially reduce the noise of air (gases) passing through the channel. The special channel can have a zigzag shape or the configuration of a square wave or sine wave. Other configurations can be used.

Preferably, the sound attenuating chamber has a set of staggered baffles which block, deflect, and vary the direction of flow of the dedusted air (gases) to attenuate the sound and decrease the decibel level of the filtered clean air prior to discharge by the vacuum loader or other equipment.

The vacuum loader can be a two compartment, four stage, vacuum cleaner loader with a two stage solids-gas separating compartment to remove larger particulates of dust and a two stage filtering compartment to substantially remove the remaining particulates of dust. The two stage solids-gas separating chamber can have a lower stage containing a tangential cyclone mounted below the silencer base and an upper stage with at least one deflector extending above the silencer base. The deflector can take the form of a spiral deflector or parallel annular deflectors or rings.

The two stage filtering compartment can have a filtering stage and a separation stage. The filtering stage can have at least one and preferably a set of two to four canisters with tubular filters therein. The separation stage can have overhead nozzle or ports, arranged in a flow pattern, such as in a circular array, to direct the dusty gas stream downwardly and about the outside of the filters. One or more air injectors can be provided to periodically clean the filters.

As used in this Patent Application, the term "dust" means particulate matter, debris and waste.

The terms "dedust" and "dedusted" as used herein means removing a substantial amount of dust.

A more detailed explanation of the invention is provided in the following description and appended claims taken in conjunction with the accompanying drawings.

DETAILED DESCRIPTION OF THE PREFERRED EMBODIMENT

Figure 1:
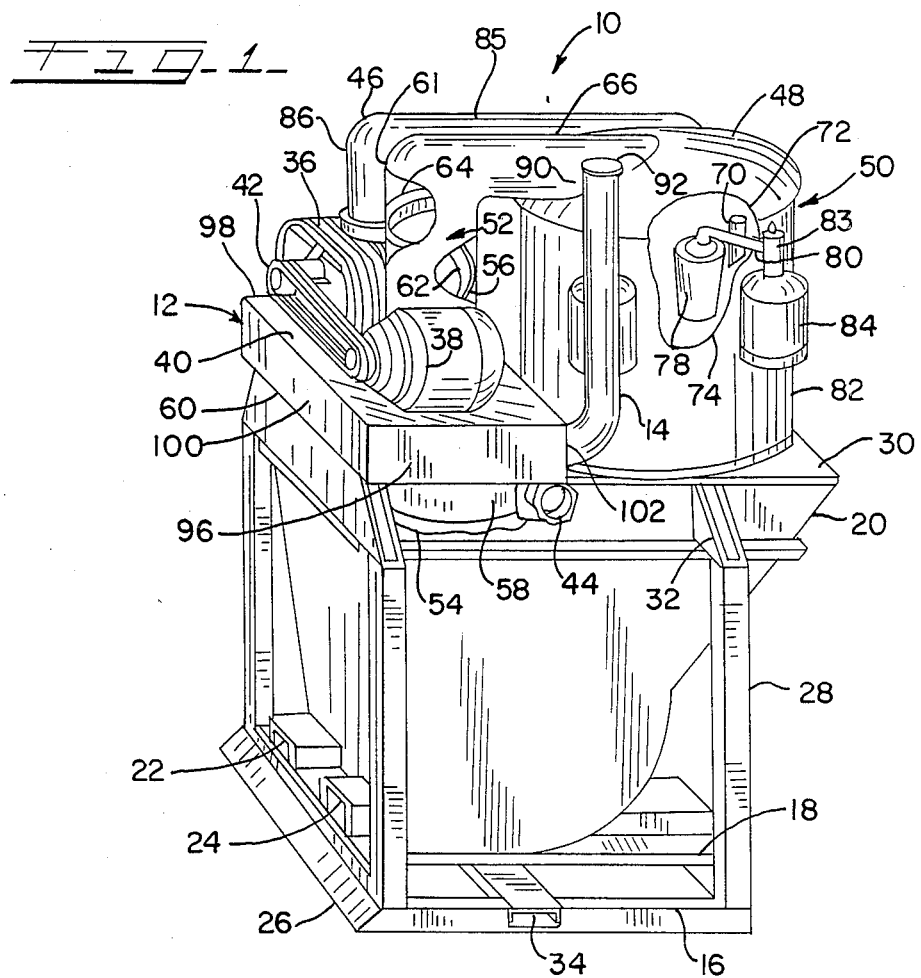
FIG. 1 is a fragmentary perspective view of a two compartment, four stage, vacuum loader with a silencer base in accordance with principles of the present invention.

A two compartment, four stage, vacuum cleaner loader 10 (FIG. 1) is equipped with a silencer base 12. The silencer base 12 provides a sound abatement control and a muffler assembly which decreases and dampens operational noises of the filtered dedusted air, vacuum pump, belts, and motor, to safe and comfortable levels before it is discharged from the vacuum loader 10 through the overhead upright exhaust pipe 14. The two compartment, four stage, vacuum cleaner loader 10 provides a heavy-duty vacuum-operated industrial collector and conveyor to quietly process, efficiently remove, effectively collect, and safely dispose of particulate matter, debris, and waste.

The two compartment, four stage, vacuum cleaner loader 10 (FIG. 1) has a frame assembly 16 which provides a cradle 18 for receiving a bin or hopper 20 such as a standard 27 cubic foot, end dump hopper. The frame assembly 16 and hopper 20 can have parallel forklift-channels 22 and 24 for receiving and being moved by tines of a forklift truck. The bottom of the frame assembly 16 has rectangular support members or skids 26. Four vertical posts 28 are securely connected to and extend upwardly from the corners or ends of the skids 26.

An upper, horizontal support platform 30 (FIG. 1) with slanted support arms 32 is securely connected to, positioned upon, and extends between the tops of the posts 28. A transverse bar 34 provides a bellows-raisable channel which extends across the skids 26 and under the bin 20, to move the top of the bin 20 flush into sealing engagement against the underside of the support platform. Wheels or casters (not shown) can be mounted on the underside of the base to enable the frame assembly to be mobile and portable.

As shown in FIG. 1, an air blower, vacuum pump, or fan 36 and motor 38 are mounted on a flat or planar support surface 40 comprising the top plate and ceiling of the silencer base 12. The air blower 36 is operatively connected to and driven by the motor 38 by drive belts 42. The air blower (vacuum pump) creates a vacuum (suction) to draw dust and direct influent dusty air (air laden with particulates of dust) through an inlet conduit 44. The air blower 36 is connected by an overhead blower line and outlet conduit 46 to the domed top and cover 48 of the filter compartment 50.

The vacuum loader 10 (FIG. 1) can have an automatic shutoff control panel mounted on the support platform 30 and connected to a sensor and limit switch in the bin 20 to automatically shut off the air blower 36 or motor 38 when the discharged collected dust in the bin 20 has reached a preselected level. An intake hose with an optional nozzle can be connected to the intake conduit 44.

The two compartment, four stage, vacuum cleaner loader 10 (FIG. 1) has a two stage solids-gas separation compartment or chamber 52 and a two stage filtering compartment or chamber 50. The solids-gas separation compartment 52 has a lower, first, gross separation stage 54 and an upper second defector stage 56. The lower gross separation stage 54 contains a tangential cyclone 58. The tangential cyclone 58 is connected to and communicates with the intake conduit 44 and has an open bottom or bottom outlet to discharge larger particulates into the bin 20. The tangential cyclone 58 has an open top or top outlet to discharge the remaining entrained particulates and air into the upper deflector stage. The top of the tangential cyclone 58 is spaced closely adjacent and below the bottom plate or floor 60 of the silencer base 12.

The upper deflector stage 56 (FIG. 1) of the vacuum loader 10 has an upright tubular portion 61 which extends above the lower gross separation stage 54 and the top 40 of the silencer base 12. The upper defector stage 56 contains at least one deflector or baffle extending above the top 40 of the silencer base 12. The deflector (baffle) can take the form of a spiral baffle or helical deflector 62 and/or a parallel set of annular deflectors, baffles, or rings 64.

The spiral baffle 62 (FIG. 1) in the upper deflector stage 56 extends above and cooperates with the tangential cyclone 58 in the lower gross separation stage 54 to make a gross cut and remove the larger particulates of dust so as to partially dedust the influent dusty air. The parallel set of horizontal rings or annular baffles 64 can be concentrically positioned about the vertical axis of the upper deflector stage 56 and extend above and cooperate with the tangential cyclone 58 in the lower gross separation stage 54 to make a gross cut and remove the larger particulates of dust so as to partially dedust the influent dusty air. The rings 64 can be connected to the walls of the upper deflector stage 56 and can be connected and spaced from each other by rods.

A horizontal intermediate conduit 66 (FIG. 1) extends between and connects the upper defector stage 56 with the domed roof and cover 68 of the two stage filtering compartment 50. The intermediate conduit 66 is connected to and communicates with an overhead array of downwardly facing ports, slots or nozzles 70 in the domed roof 68 for passing, conveying, and injecting the partially dedusted air into the filtering compartment 50.

The filtering compartment 50 has a separation stage 72 and a filtering stage 74. The separation stage 72 contains a circular set of downwardly facing ports, slots or nozzles 70 in the domed roof 68 for downward air flow to remove particulates of dust by kinetic energy. The filtering stage 74 contains a series of two, and preferably four, filter-canisters 76 for upward air flow to filter and remove the remaining particulates of dust. Each of the canisters 76 contains a vertically positioned, tubular annular filter 78. The two stage filtering compartment 50 provides excellent dispersion, diffusion, and filtering of the dust particulates.

The downwardly facing overhead nozzles 70 are arranged to cooperate with each other to direct the partially dedusted air downwardly in a downwardly annular flow pattern about the outside of the filters-canisters 76, so that the air will pass inwardly through the filters. The filtered air is deflected and drawn upwardly through the centers of the tubular filters 78 to the upper portion of the filtering compartment 50 near the domed roof 68. The filters 78 remove the fines (minute fine dust particles) and substantially all the remaining particulates of dust in the dusty air stream to produce a dedusted purified air stream.

Air injectors 80 (FIG. 1) can be mounted on the middle portion of the upright cylindrical wall 82 of the two stage filtering compartment 50. The air injectors 80 provide reverse pulse filter cleaners to periodically inject intermittent blasts of clean air upon the inside or outside of the tubular filters 78 to help clean the filters. The injectors 80 can be connected by pneumatic tubes or conduits 83 to an air supply source, such as compressed air canisters 84, compressed air tanks, or an auxiliary compressor. The air injectors 80 sequentially inject pulses of compressed air into the center of the tubular filters to shake loose the dust collected, accumulated, or caked on the filters. The removed dust collected and accumulated on the bottom of the filtering compartment 50 can be discharged into the bin 20 or lower gross separation stage 54 when the blower 36 is turned off.

An outlet conduit 85 (FIG. 1) extends between and connects the filtering compartment 50, at a location adjacent the domed roof 68, to the vacuum suction pump 36 (air blower). The outlet conduit 85 has an elongated horizontal discharge portion 86 and a vertical outlet portion 88. The outlet conduit 85 provides a discharge and passageway through which the purified, dedusted, filtered clean air is drawn into the vacuum suction pump 36 (air blower) and silencer base 12 (muffler) for quiet discharge through the upright exhaust pipe 14 to the atmosphere or area surrounding the vacuum loader 10.

The outlet 90 (FIG. 1) of the exhaust pipe 14 can have a pivotable closure lid 92. The closure lid 92 opens during use to quietly dishare the clean air into the atmosphere or area surrounding the vacuum loader 10 but covers the outlet 90 when the blower 36 is turned off.

The silencer base 12 (FIG. 1) provides a muffler and sound abatement control to muffle, dampen, and abate the noise and sound level of the filtered, dedusted, purified clean air before it is discharged through the upright exhaust pipe 14 into the atmosphere or area surrounding the vacuum loader 10. The silencer base 12 is mounted on the support platform 30 above the tangential cyclone 58 of the lower gross separation stage 54 of the solids-gas separation compartment 52 and is positioned downstream, below, and in communication with the vacuum suction pump 36.

The silencer base 12 (FIG. 1) has a box-like rectangular, support housing 94 with an upper horizontal support surface or top plate 40 for supporting and dampening the vibrations of the vacuum pump 36 and motor 38. The floor or bottom plate 60 of the housing 94 is positioned above the tangential cyclone 58. The upright vertical end walls 96 and 98 of the housing 94 extend laterally between the housing's ceiling 40 (top plate) and floor 60 (bottom plate). The elongated upright side walls 100 and 102 of the housing 94 extend longitudinally between the housing's ceiling 40 (top plate) and floor 60 (bottom plate).

Figure 2:
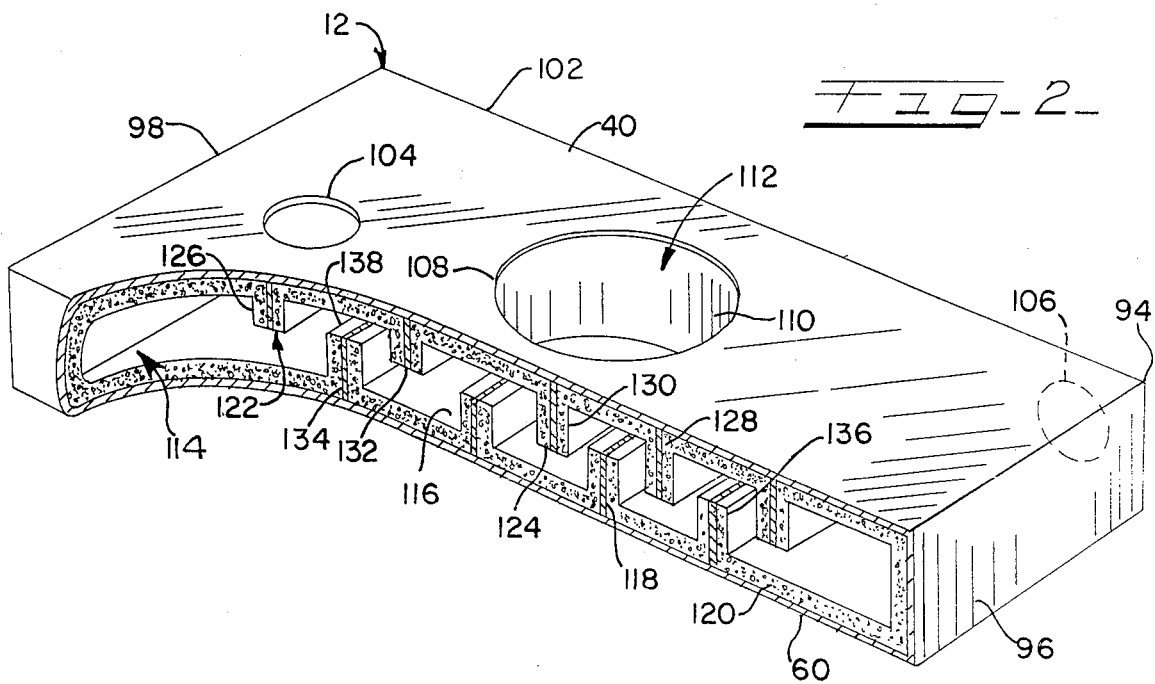
FIG. 2 is an enlarged perspective view of the silencer base with portions cut away and shown in cross section for ease of understanding and clarity.
Figure 3:
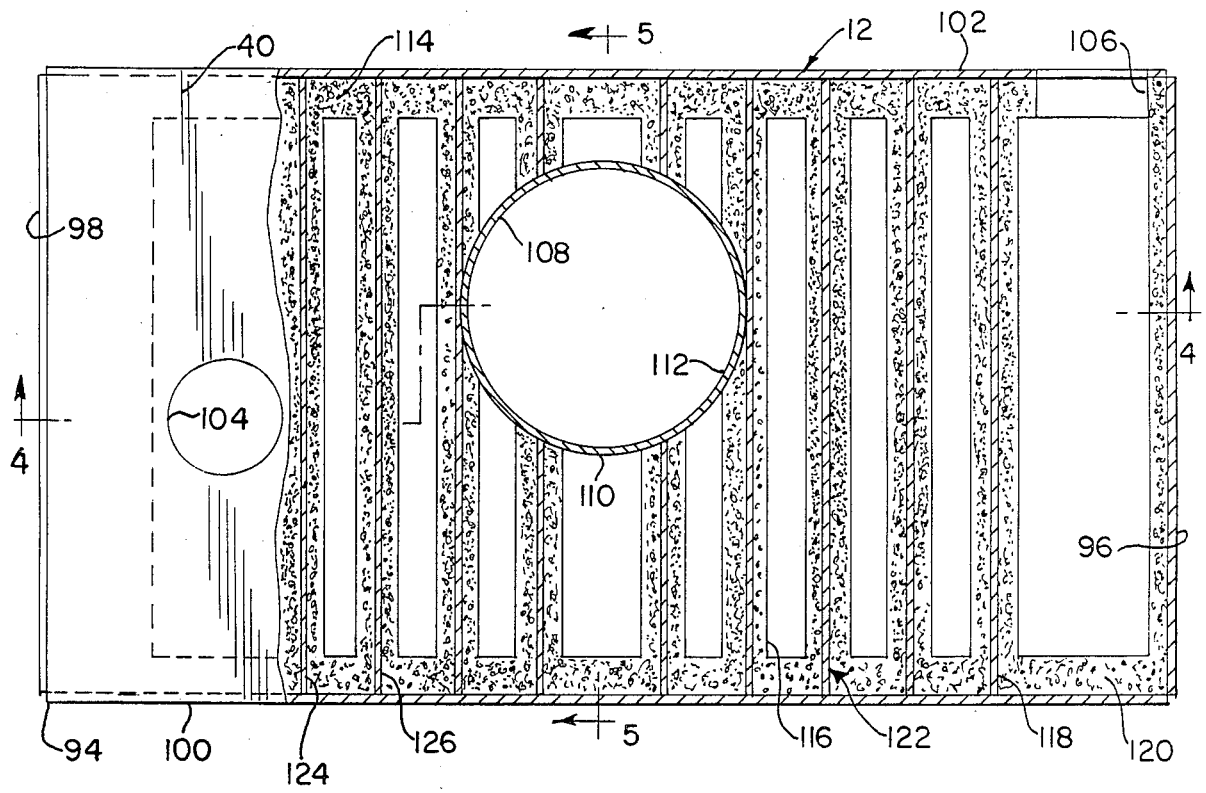
FIG. 3 is a to plan view of the silencer base with a portion of the top plate removed for ease of understanding and clarity.
Figure 4:
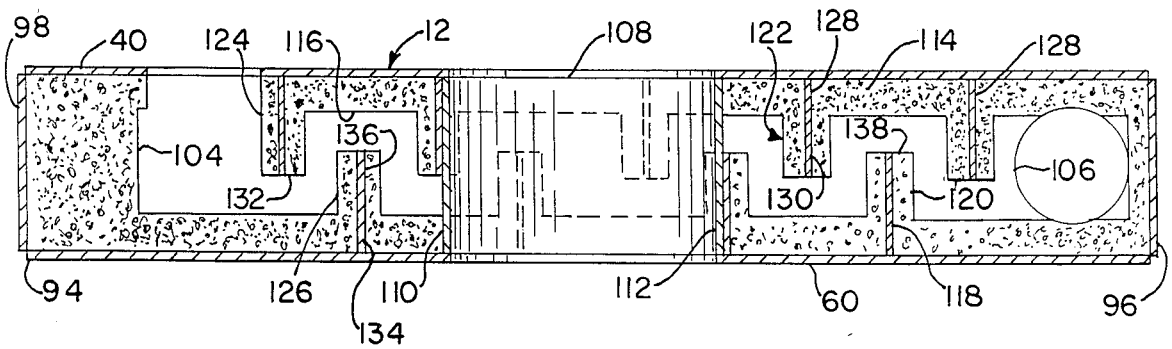
FIG. 4 is a side view of the silencer base taken substantially along lines 4—4 of FIG. 3.
Figure 5:
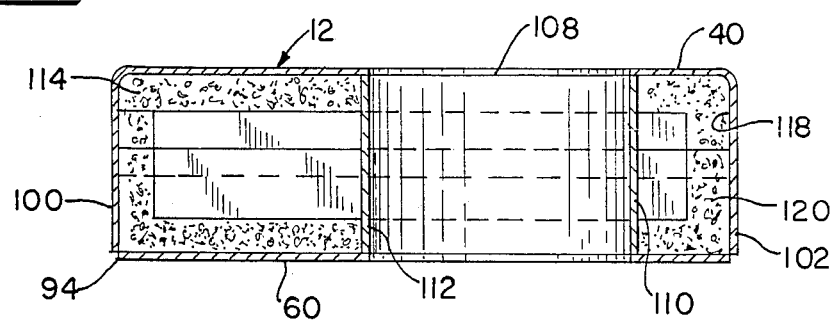
FIG. 5 is an end view of the silencer base taken substantially along lines 5—5 of FIG. 3.

As shown in FIGS. 2-4, the top plate 40 of the silencer base 12 has an upwardly facing inlet port or opening 104 which is positioned in proximity to the back end wall 98 of the housing 94. The inlet port 104 is positioned below and communicates with the vacuum pump 36 (FIG. 1) for ingress of filtered, dedusted, purified clean air from the vacuum pump 36.

The right side wall 102 (FIGS. 2-4) of the silencer base 12 has an inwardly facing outlet port or opening 106 positioned adjacent the front end wall 96 of the housing 94. The outlet port 106 is positioned perpendicular at right angles to the inlet port 104. The outlet port 106 is connected to and communicates with the exhaust pipe 14 (FIG. 1) for quiet exhaust and egress of the filtered, dedusted, purified clean air into the atmosphere or area surrounding the vacuum loader 10.

As shown in FIGS. 2-5, the housing 94 of the silencer base 12 has a centrally positioned, vertical hole 108 positioned between the inlet port 104 and the outlet port 106. The vertical hole 108 is annularly surrounded by a circular wall 110. The vertical hole 108 cooperates with the circular wall 110 to provide a circular, upright, particulate laden, gas compartment or chamber 112 which extends upwardly through the housing's ceiling 40 (top plate) and floor 60 (bottom plate).

The circular wall 110 (FIGS. 2-5) annularly surrounds and is positioned adjacent the upright tubular portion 62 of the upper deflector stage 56 of the solids-gas separation compartment 52. The centrally positioned, vertical hole 108 and circular, upright, particulate laden, gas chamber 112 receive and accommodate the upright tubular portion 62 of the upper deflector stage 56 of the solids-gas separation compartment 52. The circular, upright, particulate laden, gas chamber 112 can have a substantially larger cross section than the inlet port 104. The circular, upright, particulate laden, gas chamber 112 accommodates upward passage of particulates within and through the upright tubular portion 61 of the upper deflector stage 56 of the solids-gas separation compartment 52 in opposite, countercurrent flow relationship to the downward passage of the influent clean air into the inlet port 104.

As shown in FIGS. 2-4, the silencer base 12 has an internal composite sound attenuating chamber 114 within the housing 94. The sound attenuating chamber 114 has a zigzag channel 116 which extends longitudinally between and communicates with the inlet port 104 and the outlet port 106. The channel 116, which is sometimes referred to as a reverse direction channel, conveys and passes the filtered, dedusted, purified clean air forwardly in a zigzag, sinusoidal, or square wave flow pattern from the inlet port 104 to the outlet port 106. The reverse direction channel 116 can have a zigzag, sinusoidal, or square wave configuration to vary the direction and substantially reduce the noise of gases passing through the channel 116.

The composite, sound attenuating chamber 114 (FIGS. 2 and 3) has an acoustical inner core 118 and an sound dampening outer shell or skin 120. The inner core 118 includes the interior surfaces of the housing 94 and the upright exterior surfaces of the baffles 122. The inner core 118 is preferably fabricated out of metal, but can be constructed of wood or impact resistant plastic, if desired. The sound dampening outer core 120 can be bonded or otherwise secured to the inner core 118. The outer core is constructed of sound insulating and absorbing material, such as acoustical sound absorption foam, mineral wool, or fiberglass insulation. The reverse direction channel 116 extends in a zigzag manner through the outer shell 120 between the inlet and outlet ports 104 and 106. The composite, sound attenuating chamber 114 dampens the noise and substantially decreases the decibel sound level of the filtered, dedusted, purified clean air as the clean air passes through the reverse direction channel 116.

The interior, sound attenuating chamber 114 (FIGS. 2-4) of the silencer base 12 has a series of composite, upright, offset, cantilevered acoustical baffles, vertical deflectors, or internals 122 including downward baffles (deflectors) 124 and upward baffles (defectors) 126. Each of the downward baffles 124 has an upper attached portion 128 connected to and cantilevered downwardly from the ceiling 40 (top plate) of the housing 94 and an unattached lower portion 130 with a horizontal bottom edge 132 that is spaced above the floor 60 (bottom plate) of the housing 94. Each of the upward baffles 126 has a lower attached portion 134 connected to and cantilevered upwardly from the floor 60 (bottom plate) of the housing 94 and an upper unattached portion 136 with a horizontal top edge 138 that is spaced below the ceiling 40 (top plate) of the housing 94.

The downward baffles 124 extend downwardly from the ceiling 40 (top plate) of the housing 94 to a level below the top 138 of the upward baffles 126. The upward baffles 126 extend upwardly from the floor 60 (bottom plate) of the housing 94 to a height above the bottom 132 of the downward baffles 124. The upward baffles 126 are positioned and spaced between the downward baffles 124.

The composite, downward and upward baffles 122 (FIG. 3) provide gas impervious, air impermeable, lateral barriers which extend laterally across and connect the sides 100 and 102 of the housing 94. The barriers 122 block and deflect the longitudinal flow of filtered, dedusted, purified clean air and concurrently direct the clean air in the reverse direction channel 116 so as to substantially reduce the noise of the filtered, dedusted, purified clean air passing through the sound attenuating chamber 114.

In operation, air laden with entrained particulates of debris, waste and other dust is drawn by the vacuum pump 36 (FIG. 1) through the intake conduit 44 into the tangential cyclone 58 in the lower gross separation stage 54 of the solids-gas separation compartment 52. The tangential cyclone 58 swirls the dusty air laterally and ejects the effluent air upwardly through the upper deflector stage 56 of the solids-gas separation compartment 52. In the upper deflector stage of the solids-gas separation compartment 52, the spiral deflector 62 and/or rings 64 will swirl the dusty air in an upward spiral or radial flow pattern. The spiral deflector 62 and/or rings 64 cooperate with the tangential cyclone 58 to remove the larger particulates of dust and substantially decrease the concentration of dust in the air stream. The removed particulates are discharged downwardly into the bin 20 through the bottom outlet of the tangential cyclone 58.

The partially dedusted air stream is then passed laterally through the intermediate conduit 66 and injected downwardly by the nozzles or ports 70 through the separation stage 72 of the filtering compartment 50. The air is then passed laterally downwardly and radially inwardly through the filters 78 and deflected upwardly through centers of the tubular filters 78. The filters 78 removes the fines and substantially all of the remaining particulates of dust to produce a substantially dust-free air stream. The purified, dedusted, filtered clean air is drawn through the outlet conduit 85 into the vacuum suction pump 36 (air blower) and silencer base 12 (muffler) for quiet and safe discharge through the upright exhaust pipe 14 to the atmosphere or area surrounding the vacuum loader 10.

The silencer base 12 provides a muffler and sound abatement control assembly which effectively muffles, limits, and abates the noise of the clean air passing through the reverse direction channel 116 of the sound attenuating chamber 114 to comfortable levels for quiet discharge through the upright exhaust pipe 14 of the vacuum loader 10. The sound attenuating chamber 114 cooperates with the top plate 40 of the silencer base 12 to dampen the vibrations and muffle, reduce, and limit the noises emitted from the vacuum pump 36, belts 42, and motor 38, to comfortable levels during operation of the vacuum loader 10.

Among the many advantages of the two compartment, four stage, vacuum loader with a silencer base are:

1. Superior sound abatement.
2. Outstanding noise suppression.
3. Greater comfort for operating personnel and nearby persons.
4. Excellent removal of particulate matter, debris and waste.
5. Good solids-gas separation.
6. Enhanced air purification.
7. Excellent dedusting.
8. Less maintenance.
9. Economical.
10. Easy to use.
11. Efficient.
12. Safe.
13. Quiet.
14. Effective.

Although embodiments of the invention have been shown and described, it is to be understood that various modifications and substitutions, as well as rearrangements of parts, can be made by those skilled in the art without departing from the novel spirit and scope of this invention.

What is claimed is:

1. A muffler assembly, comprising:
a silencer base comprising a support housing;
said housing defining an inlet port and an outlet port; and having
an internal composite sound attenuating chamber;
said composite sound attenuating chamber having a channel communicating with the ports for varying the direction and substantially reducing the noise of gases passing through said channel; and
said composite sound attenuating chamber having an acoustical inner core substantially covered by an external outer shell, said acoustical inner core comprising a series of offset cantilevered acoustical metal baffles, and said external outer shell comprising sound insulating and absorbing material substantially covering said baffles for dampening the noise of said gases passing through said channel.

2. A muffler assembly in accordance with claim 1 wherein said housing has a ceiling, a floor, and an upright particulate laden gas compartment extending substantially vertically through said ceiling and said floor, said upright particulate gas laden compartment defining an upright particulate laden gas passageway passing upwardly through said composite sound attenuating chamber, said upright particulate gas laden compartment comprising a circular upright wall annularly surrounding said upright particulate laden gas passageway, said circular wall separating and substantially preventing passage of gases between said upright particulate laden gas passageway and said channel, and said upright particulate gas laden passageway being positioned between said ports for passage of another stream of gases.

3. A muffler assembly in accordance with claim 1 wherein said housing includes a ceiling comprising a support platform for attachement to and supporting noisy vibrating machinery or equipment and said composite sound attenuating chamber substantially reduces the noise and vibrations of said machinery or equipment.

4. A muffler assembly in accordance with claim 1 wherein said channel comprises a generally zigzag channel with alternating upwardly and downwardly extending baffles.

5. A muffler assemby in accordance with claim 1 wherein said housing has a composite ceiling, floor, and sides, and said sound insulating and absorbing material internally covers said ceiling, floor, and sides.

6. A muffler assembly in accordance with claim 1 wherein said silencer base is spaced externally and away from a filter for substantially preventing dusty air from entering said silencer base.

7. A muffler assembly, comprising:
a silencer base comprising a support housing;
said housing defining an inlet port and an outlet port; and having
an internal composite sound attenuating chamber;
said composite sound attenuating chamber having a channel communicating with said ports for varying the direction and substantially reducing the noise of gases passing through said channel; and
said composite sound attenuating chamber having a series of baffles within said channel for serial passage of said gases and composite acoustical means comprising sound insulating and absorbing material for dampening the noise of said gases passing through said channel.

8. A muffler assembly in accordance with claim 7 wherein said composite sound attenuating chamber has a ceiling comprising a support platform for attachment to and supporting noisy vibrating machinery and said composite sound attenuating chamber substantially reduces the noise and vibrations of said machinery.

9. A muffler assembly in accordance with claim 8 wherein said baffles comprise composite baffles having an inner core comprising a material selected from the group consisting of metal and plastic and an outer shell comprising sound insulating and absorbing material substantially covering said inner core.

10. A muffler assembly for use with a vacuum loader and the like, comprising:
a silencer base comprising a support housing with a substantially planar, horizontal, pneumatic equipment-engaging support surface for supporting and abuttingly engaging pneumatic equipment comprising at least one member selected from the group consisting of a motor, vacuum pump, blower, and fan, said support surface providing a ceiling for said silencer base;
said housing having a substantially horizontal floor for positioning upon a tangential cyclone of a vacuum cleaner loader, upright end walls extending laterally between said ceiling and said floor, and elongated side walls extending longitudinally between said ceiling and said floor;
said ceiling defining an upwardly facing inlet opening in proximity to one of said end walls for ingress of air;
one of said side walls defining a laterally facing outlet opening positioned adjacent the other end wall for egress of air, said outlet opening positioned substantially perpendicular to said inlet opening;
said silencer base having an upright particulate laden gas compartment extending through said ceiling and said floor for annularly surrounding and accommodating an upright deflector section of said vacuum cleaner loader, said upright compartment including an upright particulate laden gas passageway positioned between said inlet and outlet openings and having a substantially circular cross section for passing influent particulate laden gases substantially upwardly through said deflector section of said vacuum loader;
said housing having an internal composite sound attenuating compartment with a zigzag channel extending longitudinally between and communicating with said inlet and outlet openings for passing filtered dedusted air laterally in a zigzag flow pattern between said inlet opening, and said outlet opening;
said composite sound attenuating chamber cooperating with said support surface for substantially dampening vibrations and muffling noises emitted from said pneumatic equipment;
said composite sound attenuating chamber having a an acoustical inner core and an outer shell, said acoustical inner core comprising a series of upright offset, cantilevered acoustical baffles, and said outer shell comprising sound insulating and absorbing material substantially covering said baffles, walls, ceiling and floor for dampening the sound of the filtered dedusted air as said filtered dedusted air passes through said zigzag channel; and
said series of upright offset, cantilevered acoustical baffles comprising downward baffles and upward baffles, each of said downward baffles comprising an upper attached portion connected to and cantilevered from said ceiling and an unattached lower portion having a bottom spaced above said floor, each of said upward baffles comprising a lower attached portion connected to and cantilevered from said floor and an upper unattached portion having a top spaced below said ceiling, said downward baffles extending substantially downwardly from said ceiling to a level below the top of said upward baffles, said upward baffles spaced between said downward baffles and extending substantially upwardly from said floor to a height above the bottom of said downward baffles, and said downward and upward baffles comprising gas impervious lateral barriers extending laterally across and connecting said sides of said housing for substantially blocking and deflecting longitudinal flow of filtered dedusted air and directing said filtered dedusted air between said baffles in said zigzag channel to substantially reduce the noise of said filtered dedusted air passing through said sound attenuating chamber.

11. A muffler assembly in accordance with claim 10 wherein said channel comprises a sinusoidal-shaped channel.

12. A muffler assembly in accordance with claim 10 wherein said channel comprises a generally square wave-shaped channel.

13. A muffler assembly in accordance with claim 10 wherein said upright particulate laden gas passageway has a substantially larger cross section than said inlet opening for accommodating upward passage of particulates in countercurrent flow relationship to the downward passage of filtered dedusted air into said inlet opening.

14. A vacuum loader, comprising:

a bin;

a frame assembly providing a cradle for slidably receiving said bin, said frame assembly having a base, posts extending upwardly from said base, and a support platform secured to, positioned upon and extending laterally between said posts;

a solids-gas separation compartment having a lower gross separation stage and an upper deflector stage, said lower gross separation stage being positioned below said support platform and containing a tangential cyclone, said upper deflector stage extending substantially upwardly from said lower separation stage to a position substantially above said support platform, said upper deflector stage comprising deflector means extending above and cooperating with said cyclone for partially dedusting a dust-laden stream of influent dusty air;

an inlet conduit connected to and communicating with said tangential cyclone;

a vacuum pump for drawing said influent dusty air through said inlet conduit into said tangential cyclone;

a filtering compartment extending substantially upwardly from said support platform, said filter compartment having a separation stage and a filter stage;

said separation stage of said filtering compartment having an overhead array of downwardly facing nozzles, said nozzles comprising a substantially circular set of nozzles to direct said partially dedusted air in a downwardly annular flow pattern about said filters in said separation stage;

said filter stage containing a set of tubular filters spaced along side of each other for filtering said partially dedusted stream of air as said air moves laterally and radially inwardly through said filters to provide a substantially dedusted, upwardly flowing, purified stream of air;

an intermediate conduit connected to and communicating with said solids-gas separation compartment and said nozzles for conveying said partially dedusted air from said solids-gas separation compartment to said nozzles;

an outlet conduit connected to and communicating with said filter stage and said vacuum pump for passing said purified air from said filter stage to said vacuum pump;

a silencer base mounted on said support platform above said tangential cyclone, said silencer base having a support housing with an upper substantially planar, horizontal, support surface for supporting said vacuum pump, said support surface providing a ceiling for said silencer base, said housing having a substantially horizontal floor for positioning above said tangential cyclone, upright end walls extending laterally between said ceiling and said floor, and elongated side walls extending longitudinally between said ceiling and said floor, said upper support surface of said housing defining an upwardly facing inlet opening in proximity to one of said end walls of said housing and communicating with said vacuum pump for ingress of filtered dedusted air from said vacuum pump, one of said side walls of said housing defining a laterally facing outlet opening positioned adjacent said other end wall of said housing for egress of said filtered dedusted air, said outlet opening positioned substantially perpendicular to said inlet opening;

said silencer base having an upright particulate laden gas chamber extending substantially upwardly through said ceiling and said floor of said housing for annularly surrounding and positioning adjacent to said upper deflector stage of said solids-gas separation compartment, said upright particulate laden gas chamber being located between said inlet opening and said outlet opening;

said silencer base having an internal composite sound attenuating chamber within said housing, said internal composite sound attenuating chamber having a zigzag channel extending longitudinally between and communicating with said inlet opening and said outlet opening for laterally passing said filtered dedusted air in a zigzag flow pattern between said inlet opening and said outlet opening, said composite sound attenuating chamber having an acoustical inner core and an outer shell, said acoustical inner core comprising a series of upright offset, cantilevered acoustical baffles, said outer shell comprising sound insulating and absorbing material substantially covering said baffles, walls, ceiling, and floor of said housing of said silencer base for dampening the sound of the filtered dedusted air as said filtered dedusted air passes through said zigzag channel;

said composite sound attenuating chamber cooperating with said support surface of said silencer base for substantially dampening vibrations and decreasing noises emitted from said vacuum pump; and said series of upright offset, cantilevered acoustical baffles in said zigzag channel of said silencer base comprising downward baffles and upward baffles, each of said downward baffles comprising an upper attached portion connected to and cantilevered from said ceiling of said housing and an unattached lower portion having a bottom spaced above said floor of said housing, each of said upward baffles comprising a lower attached portion connected to and cantilevered from said floor of said housing and an upper unattached portion having a top spaced below said ceiling of said housing, said downward baffles extending substantially downwardly from said ceiling of said housing to a level below the top of said upward baffles, said upward baffles spaced between said downward baffles and extending substantially upwardly from said floor of said housing to a height above the bottom of said downward baffles, and said downward and upward baffles comprising gas impervious lateral barriers extending laterally across and connecting said sides of said housing for substantially blocking longitudinal flow of filtered dedusted air and directing said filtered dedusted air between said baffles in said zigzag channel to substantially reduce the noise of said filtered dedusted air passing through said sound attenuating chamber.

15. A vacuum loader in accordance with claim 14 including a muffler exhaust pipe connected to and extending upwardly from said outlet opening of said silencer base for discharging said filtered dedusted air above said vacuum loader.

16. A vacuum loader in accordance with claim 14 wherein said deflector means of said upper deflector stage comprises a spiral baffle spiraling substantially upwardly in said upper deflector stage above said tangential cyclone and said silencer base.

17. A vacuum loader in accordance with claim 14 wherein said deflector means of said upper deflector stage comprises a substantially parallel set of horizontal annular baffles positioned substantially concentrically about a vertical axis of said upper deflector stage, said annular baffles extending to a position above said tangential cyclone and said silencer base.

18. A vacuum loader in accordance with claim 14 wherein said channel of sound attenuating chamber comprises a sinusoidal-shaped channel.

19. A vacuum loader in accordance with claim 14 wherein said channel of said sound attenuating chamber comprises a substantially square wave-shaped channel.

* * * * *